United States Patent [19]

King, Jr.

[11] Patent Number: 5,319,066
[45] Date of Patent: Jun. 7, 1994

[54] METHOD FOR MAKING POLYCARBONATES

[75] Inventor: Joseph A. King, Jr., Schenectady, N.Y.

[73] Assignee: General Electric Company, Schenectady, N.Y.

[21] Appl. No.: 71,141

[22] Filed: May 27, 1993

[51] Int. Cl.⁵ .............................................. C08G 64/00
[52] U.S. Cl. .................................... 528/199; 528/196; 528/198
[58] Field of Search .......................... 528/199, 198, 196

[56] References Cited

U.S. PATENT DOCUMENTS 5,026,817  6/1991  Sakashita et al. ................... 528/199
5,168,112  12/1992  Ueda et al. ........................... 528/199

OTHER PUBLICATIONS

Kinetics of Melt Transesterification of Diphenyl Carbonate and Bisphenol-A to Polycarbonate with LiOH H20 Catalyst, Yangsoo Kim et al., Ind. Eng. Chem. Res. 1992, 31, 2118–2127.

*Primary Examiner*—Morton Foelak
*Assistant Examiner*—Richard Lee Jones
*Attorney, Agent, or Firm*—William A. Teoli; William H. Pittman

[57] ABSTRACT

A method is provided for making aromatic polycarbonates by the melt condensation of a diaryl carbonate and an aromatic bis hydroxy compound in the presence of a condensation catalyst, such as hexahydro-2H-pyrimido[1,2-a]pyrimidine or an alkyl substituted derivative.

8 Claims, No Drawings

METHOD FOR MAKING POLYCARBONATES

CROSS REFERENCE TO RELATED APPLICATION

Cross reference to related application Ser. No. 08/076,038 filed Jun. 15, 1993 and Ser. No. 08/078,374, filed Jun. 17, 1993.

BACKGROUND OF THE INVENTION

The present invention is directed to a solventless method for making polycarbonates by a transesterification reaction between diaryl carbonate and aromatic bis hydroxy compound. More particularly, the present invention relates to the employment of a guanidine catalyst to facilitate the melt condensation between diphenyl carbonate and bisphenol A.

Methods for making polycarbonate by a solventless melt condensation reaction between diphenyl carbonate and bisphenol A are shown by Sakashita et al, U.S. Pat. No. 5,026,817. In one procedure, Sakashita et al uses reactants having a particular range of hydrolyzable chlorine. In another method, a mixed catalyst is used, such as a nitrogen containing basic compound and an aromatic hydroxy salt of an alkali metal or alkaline earth metal. Some of the preferred basic compounds are tetraalkylammonium hydroxides, such as tetramethylammonium hydroxide. It has been found, however, that during the polymerization reaction, the tetramethylammonium hydroxide decomposes to produce a variety of products which can contaminate the final polymer. A second catalyst, such as sodium hydroxide is often employed as a finishing catalyst.

A further method for making polycarbonates by melt transesterification of diphenyl carbonate with 2,2-bis(4-hydroxyphenyl)propane is shown by Yangsoo Kim et al, Industrial Engineering Chemistry Research, 1992, 31, 2118-2127. Kim et al employ a lithium hydroxide catalyst. The effects of reaction temperature and catalyst concentration and conversion of oligomer are analyzed.

Although alkali metal hydroxides have been found effective either as a finishing catalyst or as a condensation catalyst, these materials are carried into the final resin which can be adversely affected.

Basic catalysts which are sufficiently volatile, such as organic nitrogen compounds, for example organic amines, also have been evaluated as condensation catalysts. Although such organic compounds can be readily removed from the polycarbonate resin at the termination of the condensation reaction, color bodies are often generated. It would be desirable therefore, to provide organic compounds useful as catalysts for effecting the condensation between a diaryl carbonate and an aromatic bis hydroxy compound under melt conditions which are readily removable and which do not adversely affect the resulting polycarbonate resin.

SUMMARY OF THE INVENTION

The present invention is based on the discovery that an effective amount of guanidine, or certain guanidine homologs, can be used as condensation catalysts for diaryl carbonate and an aromatic bis hydroxy compound under melt conditions. It has been further found that such guanidine condensation catalysts can be readily removed from the polycarbonate resin during processing; the resulting polycarbonate resin also has been found to be substantially free of any catalyst residues.

STATEMENT OF THE INVENTION

There is provided by the present invention, a method for making aromatic polycarbonate comprising, (1) effecting reaction between a diaryl carbonate and an aromatic bis hydroxy compound under melt polymerization conditions in the presence of an effective amount of a condensation catalyst selected from guanidine compounds having the formula, $$\begin{array}{c} (CH_2)_n \diagup N \diagdown (CH_2)_m \\ \diagdown N \diagup \diagdown N \diagup \\ | \\ R \end{array}$$

where R is a member selected from the group of hydrogen and a $C_{(1-18)}$ alkyl radical, and n and m are Q whole numbers having a value between to 0 to 5 inclusive, and (2) effecting the removal of the condensation catalyst under reduced pressure at a temperature of from 150° C. to 350° C. from the resulting polycarbonate of (1).

Diaryl carbonates which can be employed in the practice of the present invention are for example, diphenyl carbonate, di-(halophenyl)carbonates, such as di-(chlorophenyl)carbonate, di-(bromophenyl)carbonate; di-(alkyl phenyl)carbonate, such as di-(tolyl)carbonate, di-(ethylphenyl)carbonate, di-(cumyl)carbonate; di-(nitrophenyl)carbonate, or mixtures thereof. Preferably, diphenyl carbonate is used.

Among the aromatic bis hydroxy compounds which can be used in the practice of the present invention are the following compounds:
resorcinol
4-bromoresorcinol
hydroquinone
4,4'-dihydroxybiphehyl
1,6-dihydroxynaphthalene
2,6-dihydroxynaphthalene
bis(4-hydroxyphenyl)methane
bis(4-hydroxyphenyl)diphenylmethane
bis(4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane2,2-bis(3-cyclohexyl-4-hydroxyphenyl)propane
2,2-bis(3-allyl-4-hydroxyphenyl)propane
2,2-bis(3-methoxy-4-hydroxyphenyl)propane 2,2-bis(3,5-dimethyl-4-hydroxyphenyl)propane
2,2-bis(2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)propane
$\alpha,\alpha$-bis(4-hydroxyphenyl)toluene
$\alpha,\alpha,\alpha',\alpha'$-Tetramethyl-$\alpha,\alpha'$-bis(4-hydroxyphenyl)-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
   bis(3,5-dimethyl-4-hydroxyphenyl)sulfone
   9,9-bis(4-hydroxyphenyl)fluorene
2,7-dihydroxypyrene
6,6'-dihydroxy-3,3,3',3'-tetramethylspiro(bis)indane("spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole Among the guanidine catalysts which can be used in the practice of the present invention there are included: n-alkylated pyrimido pyrimidines, such as 1,3,4,6,7,8-hexahydro-2H-pyrimido[1,2-a]pyrimidine, 1,3,4,6,7,8-hexahydro-1-methyl-2H-pyrimido[1,2-a]pyrimidine, 1,3,4,6,7,8-hexa-hydro-1-ethyl-2H-pyrimido[1,2-a]pyrimidine, 1,3,4,6,7,8-hexahydro-1-propyl-2H-pyrimido[1,2-a]pyrimidine, 1,3,4,6,7,8-hexahydro-1-isopropyl-2H-pyrimido[1,2-a]pyrimidine, 1,3,4,6,7,8-hexahydro-1-butyl-2H-pyrimido[1,2-a]pyrimidine, 1,3,4,6,7,8-hexahydro-1-pentyl-2H-pyrimido[1,2-a]pyrimidine, and 1,3,4,6,7,8-hexahydro-1-neopentyl-2H-pyrimido[1,2-a]pyrimidine.

In the practice of the invention, a substantially equal molar mixture of the diaryl carbonate and the aromatic bis hydroxy compound is heated at atmospheric pressures in a substantially inert atmosphere at temperatures in the range of from 150° C. to 210° C. Agitation of the mixture can be initiated as soon as the components start to melt. The system can be agitated slowly to promote better heat exchange. After the system has been allowed to thermally equilibrate, an effective amount of the guanidine catalyst can be added. An effective amount of the guanidine catalyst is from $1\times10^{-1}$ to $1\times10^{10-4}$ parts by weight of the guanidine catalyst, per 100 parts by weight of the condensation mixture.

The resulting solution can be stirred until the catalyst has been dispersed and the reaction temperature of the mixture can be raised to 180° C. to 210° C. while the pressure can be lowered to 175 to 250 torr. Distillation of aromatic hydroxy compound can be effected and the pressure continuously reduced to further effect the separation of the aromatic hydroxy compound. The pressure of the reaction can be further reduced to 70 to 130 torr while the temperature can be increased to 220° C. to 250° C. The final stage of the reaction can be initiated by placing the condensation product under full vacuum at 0.1 to 5 torr at a temperature in the range of from 270° C. to 350° C. for 0.5 to 3 hours. Recovery of the final polycarbonate can be achieved after the theoretical amount of aromatic hydroxy compound has been collected.

In order that those skilled in the art will be better able to practice the present invention, the following examples are given by way of illustration and not by way of limitation. All parts are by weight unless otherwise indicated.

EXAMPLE 1

There were added 136.98 g (0.600 mol) of powdered bisphenol A (BPA), and 138.7 g (0.64 mol) of powdered diphenyl carbonate (DPC) into a liter melt polymerizer. The reactor was deoxygenated by evacuating it to about 1–0.5 torr and refilled with nitrogen. The deoxygenation procedure was repeated three times. The reactor was then immersed in a fluidized heat bath and preheated to 180° C. The DPC/BPA mixture was allowed to melt to a colorless, homogeneous liquid. The melt was stirred slowly to promote better heat exchange. The mixture was allowed to thermally equilibrate (5–10 min) while stirring at 250 rpm. Into this solution there was added 1 eq or 21.3 mg ($1.5\times10^{-4}$ mol) of 1,3,4,6,7,8-hexahydro-2H-pyrimidol[1,2-a]pyrimidine. The resulting solution was stirred for 5 min at 180° C. The reaction temperature was then raised to 210° C. and the pressure lowered to 175 mm Hg. After a couple of minutes, phenol began to distill out of the reactor vessel into an evacuated received flask (3 drops/sec). After 35 min, the reactor pressure was lowered to 100 mm Hg and held there for another 35 min. Phenol continued to distill into the receiver flask (1 drop/sec). The reactor pressure was lowered to 15 torr while the temperature was raised to 240° C. These conditions were maintained for 40 min; the pressure was dropped to 2 torr while the temperature was increased to 270° C. While maintaining these conditions for 20 min, the product started foaming after 12 min. at 270° C., and continued to foam for 13 min. At the termination of the reaction, the melt was placed under full vacuum (0.18 torr) at 300° C. for 1.5 hr; the reactor head pressure remained at 1.0 torr during the final stage. After 8 min at 300° C., the stirrer speed was reduced to 125 rpm due to excessive viscosity build in the product. After an additional 30 min at 300° C., the stirrer speed was reduced to 50 rpm's. There was obtained 119.2 g of phenol in the overhead receiver (theoretical 123.1 g). There also was obtained a colorless product. Based on method of preparation, the product was a polycarbonate. It had a $M_w=41,989$, $M_n=17,466$, $M_w/M_n=2.404$, $M_z=67,692$, and an OH% (end-group)$=0.1453\%$.

The above procedure was repeated except that (5.5 mg, $3.87\times10^{-5}$ mol) or 0.25 eq of the above pyrimidine catalyst was added to the mixture. There was obtained a colorless polycarbonate with an $M_w=45,568$, $M_n=18,653$, $M_w/M_n=2.432$, $M_z=72,344$ and $0.1102\%$ of OH%.

The above procedure was repeated except that 0.1 eq of the pyrimidine catalyst, or 2.0 mg ($1.4\times10^{-5}$ mol) was added as the condensation catalyst. There was obtained a colorless melt polycarbonate having the following properties: $M_w=46,589$, $M_n=22,382$, $M_w/M_n = 2.082$, $M_z = 73,866$ and OH% (end group) = 0.1321%.

EXAMPLE 2

In accordance with the process of example 1, 136.98 g (0.600 mol) of bisphenol A and 1.080 = (138.7 g; 6.648 mol) of diphenylcarbonate were added into a liter melt polymerizer as powders. The reactor was deoxygenated by evacuating it to about 1-0.5 torr and then refilling it with nitrogen. The deoxygenation procedure was repeated three times. The reactor vessel was then immersed in a fluidized heat bath preheated to 180° C. The DPC/BPA mixture was allowed to melt. A colorless, homogeneous liquid was formed. The mixture was stirred at 250 rpm to promote better heat exchange for 5-10 minutes. There was added 1,3,4,6,7,8-hexahydro-1-methyl-2H-pyrimidol[1,2-a]pyrimidine catalyst (23.5 mg or 22 μl; $1.5 \times 10^{-4}$ mol). The resulting solution was stirred 5 min at 80° C. The reaction temperature was then raised to 10° C. and the pressure lowered to 175 mm Hg. After a couple of minutes, phenol began to distill from the reactor into an evacuated receiver flask (3 drop/sec). After 35 min, the pressure was lowered to 100 mm Hg and held there for another 35 min. Phenol continued to distill into the receiver flask (1 drop/sec). The pressure was lowered to 15 torr while the temperature was raised to 240° C. for a period of about 40 min. The pressure was then dropped to 2 torr while the temperature was increased to 270° C. for 20 min. The final stage of the reaction was initiated by employing a full vacuum (0.18 torr) at 300° C. for 1.5 hr; the actual reactor head pressure remained at 1.0 torr. Foaming of reaction product started after 6 min at 300° C., and continued for 8 min. Product viscosity started to build immediately after the foaming ceased. After 53 min at 300° C., the rpm of the stirrer was reduced to 125 due to excessive viscosity build-up. After an additional 30 min at 300° C., the stirrer speed was reduced to 50. A total of phenol 119.6 g of the 123.2 g (theory) was collected from the overheads. The melt polycarbonate appeared colorless with an $M_w = 49,497$, $M_n = 23,907$, $M_w/M_n = 2.070$, $M_z = 78,686$.

The above procedure was repeated except that there was employed 0.5 equivalents or 11 μl ($0.75 \times 10^{-4}$ mol) of the above N-methyl pyrimidine catalyst. There was obtained a polycarbonate having the following properties: $M_w = 44,528$, $M_n = 21,791$, $M_w/M_n = 2.043$ and $M_z = 70,720$ and OH% (end group) = 0.1348%.

When 0.25 equivalents of the N-methyl pyrimidine catalyst was used (5.9 mg $3.75 \times 10^{-5}$ mol), a polycarbonate was obtained having the following properties: $M_w = 24,796$, $M_n = 10,971$, $M_w/M_n = 2.260$ and $M_z = 40,038$.

EXAMPLE 3

The procedure of example 1 was repeated except that N-isopropylguanidine was used as the catalyst. There was added, 1,3,4,6,7,8-hexahydro-1-isopropyl-2H-pyridido[1,2-a]pyrimidine catalyst (2.6 mg; $1.5 \times 10^{-5}$ mol) or 0.1 eq to the stirred melt of 36.98 g (0.600 mol) of bisphenol A and 138.7 g (0.648 mol) of diphenyl carbonate. The resulting solution was stirred for 5 min at 180° C. The temperature of 210° C. and a pressure of 175 mm Hg was maintained for 35 minutes and phenol was collected. The pressure was then lowered to 100 mm Hg and held for another 35 min while additional phenol was distilled and collected. The pressure was then lowered to 15 torr and the temperature raised to 240° C. for 40 min. The pressure was dropped to 2 torr while the temperature was increased to 270° C. These conditions were maintained for 20 min. The material started foaming after 4 min at 270° C., and foamed for 13 min. The viscosity started to build immediately after the foaming ceased. The final stage of the reaction was initiated by placing the melt material under full vacuum (0.14 torr) at 300° C. for 1.5 hr; the reactor head pressure was maintained at 1.0 torr during the final stage. After 60 min at 300° C., the stirrer speed was reduced to 125. A total of 121.7 g of phenol was collected. The melt polycarbonate appeared colorless with an $M_w = 40,576$, $M_n = 20,507$, $M_w/M_n = 1.979$, $M_z = 63,643$, and OH% (end-group) = 0.1523%.

The above procedure was repeated except that there was used 0.05 equivalents of the isopropyl pyrimidine catalyst. A polycarbonate was obtained having the following properties: $M_w = 39,253$, $M_n = 19,841$, $M_w/M_n = 1.978$, $M_z = 61,292$, and OH% (end group) = 0.165%.

EXAMPLE 4

The procedure of example 1 was repeated except that 0.5 equivalents of 1,3,4,6,7,8-hexahydro-1-propyl-2H-pyrimidol[1,2-a]pyrimidine catalyst (13.7 mg; $7.5 \times 10^{-5}$ mol) was added to a melt of 136.98 g of bisphenol A and 138.7 g of diphenyl carbonate. The resulting solution was stirred for 5 min at 180° C. The reaction temperature was raised to 210° C. and the pressure lowered to 175 mm Hg. Phenol began to distill and after 35 min, the pressure was lowered to 100 mm Hg and held there for 35 min. While continuing to collect phenol, the pressure was lowered to 15 torr while the temperature was raised to 240° C. After 40 minutes, the pressure was dropped to 2 torr while the temperature was increased to 270° C. These conditions were maintained for 20 min. The melt material was placed under full vacuum (0.18 torr) at 300° C. for 1.5 hr; the reactor head pressure was maintained at 1.0 torr. The product started foaming after 1 min at 300° C., and foamed for 10 min. The viscosity started to build immediately after the foaming ceased. After 75 min at 300° C., the stirrer speed was reduced to 125 due to excessive viscosity build in the product. There was obtained a colorless polycarbonate having a $M_w = 42,733$, $M_n = 17,961$, $M_w/M_n = 2.379$, $M_z = 68,736$, and OH% (end-group) = 0.1362%.

EXAMPLE 5

The procedure of example 1 was repeated, except that 0.05 eq of 1,3,4,6,7,8-hexahydro-1-neopentyl-2H-pyrimido[1,2-a]pyrimidine catalyst (15.7 mg; $7.5 \times 10^{-5}$ mol) was added to a melt of 136.98 g (0.600 mol) of bisphenol A and 138.7 g (0.648 mol) of diphenyl carbonate. The resulting solution was stirred for 5 min at 180° C. The reaction temperature was raised to 210° C. and the pressure lowered to 175 mm Hg and phenol began to distill out of the reactor. After 35 min, the pressure was lowered to 100 mm Hg and held there for another 35 min. Phenol continued to distill and the reactor pressure was lowered to 15 torr while the temperature was raised to 240° C. After 40 min, the pressure was dropped to 2 torr and the temperature was increased to 270° C. These conditions were maintained for 20 min; the melt was placed under full vacuum (0.1 torr) at 300° C. for 1.5 hr; the reactor pressure remained at 1.0 torr during the final stage. The material started foaming after 3 min. at 300° C., and foamed for 8 min. After 58 min at 300° C., the stirred speed was reduced to 125. The total amount of phenol collected was 121.2 g. There was obtained a polycarbonate having a $M_w = 42,589$, $M_n = 18,321$, $M_w/M_n = 2.325$, $M_z = 68,885$, and OH% (end-group) = 0.1347%.

Although the above examples are directed to only a few of the very many variables which can be employed in the practice of the method of the present invention, it should be understood that the present invention is directed to the use of a much broader variety of diaryl carbonates, aromatic bis hydroxy compounds and guanidine or guanidine homologues as condensation catalysts as set forth in the description preceding these examples.

What is claimed is:

1. A method for making aromatic polycarbonate comprising, (1) effecting reaction between a diaryl carbonate and an aromatic bis hydroxy compound under melt polymerization conditions in the presence of an effective amount of a condensation catalyst selected from compounds having the formula,

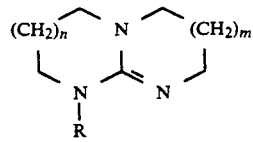

where R is a member selected from the group consisting of hydrogen and a $C_{(1-18)}$ alkyl radical, and n and m are whole numbers having a value between to 0 to 5 inclusive, and (2) effecting the removal of the condensation catalyst under reduced pressure at a temperature of from 150° C. to 350° C. from the resulting polycarbonate of (1).

2. A method in accordance with claim 1, where the diaryl carbonate is diphenyl carbonate.

3. A method in accordance with claim 1, where the aromatic bis hydroxy compound is bisphenol A.

4. A method in accordance with claim 1, where the condensation catalyst is 1,3,4,6,7,8-hexahydro-2H-pyrimido[1,2-a]pyrimidine.

5. A method in accordance with claim 1, where the condensation catalyst is 1,3,4,6,7,8-hexahydro-1-methyl-2H-pyrimido[1,2-a]pyrimidine.

6. A method in accordance with claim 1, where the guanidine condensation catalyst is 1,3,4,6,7,8-hexahydro-1-isopropyl-2H-pyrimido[1,2-a]pyrimidine.

7. A method in accordance with claim 1, where the guanidine condensation catalyst is 1,3,4,6,7,8-hexahydro-1-propyl-2H-pyrimido[1,2-a]pyrimidine.

8. A method in accordance with claim 1, where the guanidine condensation catalyst is 1,3,4,6,7,8-hexahydro-1-neopentyl-2H-pyrimido[1,2-a]pyrimidine.

* * * * *